Patented May 8, 1923.

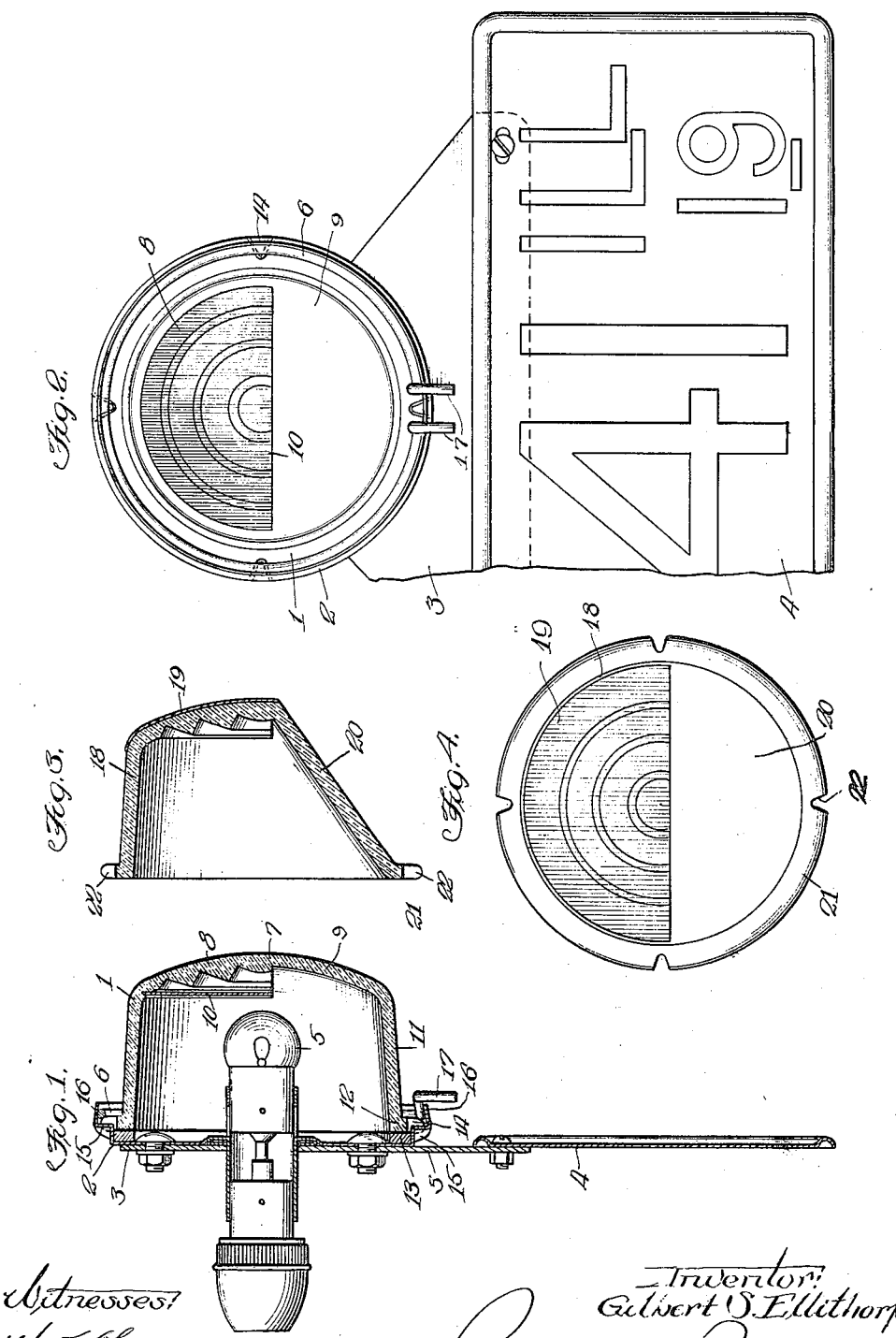

1,454,631

UNITED STATES PATENT OFFICE.

GILBERT S. ELLITHORPE, OF CHICAGO, ILLINOIS, ASSIGNOR, BY DIRECT AND MESNE ASSIGNMENTS, TO THE BAC-LITE CORPORATION, A CORPORATION OF ILLINOIS.

TAIL LIGHT.

Application filed May 10, 1920. Serial No. 380,241.

*To all whom it may concern:*

Be it known that I, GILBERT S. ELLITHORPE, a citizen of the United States of America, and a resident of Chicago, county of Cook, and State of Illinois, have invented certain new and useful Improvements in Tail Lights, of which the following is a specification.

This invention relates to tail lights for vehicles, and especially to the structure and form of the lamp casing and lens, and of the lens fastening means.

The main objects of the invention are to improve upon the device of my copending application, Serial No. 341,051, filed November 28, 1919; to provide an improved form of lens adapted to serve more efficiently in the dual capacity of maintaining a danger signal and illuminating the license plate and the roadway for a substantial distance back of and to the side of the vehicle; to provide an improved form of interfitting casing and lens flange adapted to prevent tilting or rotation of the lens; to provide an improved form of readily detachable fastening for the lens; and to provide a tail light and license plate assemblage adapted for efficient illumination of the license plate and roadway without obscuring the danger signal.

An illustrative embodiment of this invention is shown in the accompanying drawings, in which—

Fig. 1 is a vertical axial section through the lens, casing, and license plate.

Fig. 2 shows the device of Fig. 1 as viewed from behind the vehicle, part of the license plate being broken away.

Fig. 3 is the vertical axial section of a modified form of lens, having the same essential characteristics as the lens shown in Fig. 1.

Fig. 4 is a face elevation of the lens shown in Fig. 3.

In the construction shown in Fig. 1 the dished or cup-shaped lens 1 is secured demountably to the casing 2, which in turn is fastened rigidly to the frame plate 3. The license plate 4 is also fastened to the plate 3 beneath the casing 2.

The lamp 5 is mounted as usual in the socket part of casing 2, said lamp being fastened at about the center of the lens and coaxial therewith.

The lens 1 is locked in place interchangeably by means of the spring member 6 which coacts between the concentric rims of said lens and casing, as will be more fully explained.

The rearwardly facing part 7 of the lens or bottom of the cup, includes a prismatical stepped upper part 8 and a plain lower part 9. Said upper part is provided with a color screen 10, preferably red, extending somewhat below the center line of the lens whereby the danger signal is produced and whereby the clear uncolored rays from the lamp are prohibited from reaching the eye of a person positioned in a vehicle back of the tail light when in use. The lower part 9 as well as the conoidal or nearly cylindrical rim part 11 transmits clear uncolored rays directly to the roadway adjacent to the vehicle and to the license plate.

The forward edge of rim 11 is formed with a radially disposed flange 12 bearing snugly against the dust-tight gasket 13.

In order to provide positively against rotary displacement of the lens while in use the flange 12 is provided with a plurality of indentations or notches 14 and the casing 2 is correspondingly formed with upset shoulders or projections 15 to register with said notches and interfit therewith.

The casing 2 is provided with a rearwardly disposed flange 16 surrounding the adjacent part of the lens to receive the locking member or spring 6. In order to hold said spring in place, said flange 16 is slightly conoidal, being convergent toward the rear. The spring 6 is set to expand by its own tension tightly against the inner side of said flange. The ends of said spring are turned rearwardly and then radially, as at 17, in spaced relation to each other, so as to permit release of the spring by pinching the ends together sufficiently to clear the edge of rim 16, whereupon the lens may be removed or interchanged.

In order to avoid the possibility of any appreciable amount of clear light passing directly rearward in such manner as to reach the eyes of a person in a vehicle behind the tail light, the lower part of the interior of the casing is painted black so as to avoid reflection of rays therefrom. It has been found by experience that even a very small amount of clear light emanating from a point adjacent to a red light renders the signal practically invisible, or at least unnoticeable. It is to be observed that in the construction shown in Fig. 1 all rearward rays excepting those slanting downward, have to pass through the color screen 10 and that no clear rays will reach the eyes of a person following behind the vehicle bearing the tail light. Nevertheless the license plate will be effectually illuminated as well as the roadway adjacent to the vehicle, both at the sides and for a considerable distance to the rear of the tail light. It is to be noted furthermore, that although the upper or danger signal part of the lens is heavier than the clear lower part and would naturally tend by gravity to rotate out of its normal position, it is held positively by the interfitting notch and shoulder means above described.

In the form shown in Figs. 3 and 4, the lens 18 is substantially similar to lens 1, except that the danger signal part has a color screen member 19 disposed on the outer side of the lens instead of on the inner side, and the clear illuminated lower part 20 is disposed in a diagonal plane extending from the lower horizontal edge of the danger signal part to the locking flange 21. This lens is also provided with notches as shown at 22 to prevent rotation.

Although but one complete embodiment of this invention and a modified form of lens are herein shown and described, it is to be understood that some of the details of the constructions shown may be altered or omitted without departing from the spirit of this invention as defined by the following claims.

I claim:

1. A vehicle tail light lens of horizontally zoned character including an upper rearwardly facing danger signal part having a red light transmitting characteristic expressive of danger, and a lower similarly facing illuminating part visually and functionally distinct therefrom and having another light transmitting characteristic adapted for illumination of the roadway.

2. A non-glaring tail light including a casing, a lamp therefor, and a lens horizontally alined with said lamp, the upper part of the middle portion of said lens being colored to serve as a danger signal and the lower part being clear for illuminating the roadway, the said colored upper part being extended barely below the line of direct normal vision to said lamp as viewed from a vehicle or by a pedestrian in the rear.

3. A non-glaring tail light having a rearwardly facing closure member of unitary character including a lenticular upper part facing horizontally and a plain illuminating part integral therewith facing diagonally toward the ground for illuminating the roadway, said upper part being formed to resemble half of a Fresnel lens to concentrate the rays horizontally for danger signal purposes.

Signed at Chicago this 6th day of May, 1920.

GILBERT S. ELLITHORPE.